(12) United States Patent
McKelvey et al.

(10) Patent No.: US 7,514,813 B2
(45) Date of Patent: Apr. 7, 2009

(54) ELECTRIC POWER SUPPLY SYSTEM

(75) Inventors: Terence McKelvey, Chiba (JP); Eishi Marui, Kanagawa (JP); Masahiro Miyamoto, Kanagawa (JP); Motoyasu Sato, Saitama (JP); Tadashi Kataoka, Chiba (JP); Tai Furuya, Kanagawa (JP); Seiichi Ishihara, Kanagawa (JP); Takahide Ozawa, Kanagawa (JP); Noboru Kinoshita, Kanagawa (JP); Shaojun Zheng, Kanagawa (JP)

(73) Assignees: Ebara Corporation, Tokyo (JP); Ebara Densan Ltd., Tokyo (JP)

( * ) Notice: Subject to any disclaimer, the term of this patent is extended or adjusted under 35 U.S.C. 154(b) by 416 days.

(21) Appl. No.: 10/525,219

(22) PCT Filed: Aug. 21, 2003

(86) PCT No.: PCT/JP03/10564
§ 371 (c)(1),
(2), (4) Date: Sep. 12, 2005

(87) PCT Pub. No.: WO2004/019466
PCT Pub. Date: Mar. 4, 2004

(65) Prior Publication Data
US 2006/0108988 A1    May 25, 2006

(30) Foreign Application Priority Data
Aug. 21, 2002 (JP) ............................. 2002-241240
Aug. 21, 2002 (JP) ............................. 2002-241243

(51) Int. Cl.
*H02J 1/00* (2006.01)
(52) U.S. Cl. ...................................................... 307/32
(58) Field of Classification Search .................... 307/32
See application file for complete search history.

(56) References Cited

U.S. PATENT DOCUMENTS

| | | | | |
|---|---|---|---|---|
| 5,635,768 | A * | 6/1997 | Birch et al. | 290/40 C |
| 6,055,163 | A * | 4/2000 | Wagner et al. | 363/37 |
| 6,753,622 | B2 * | 6/2004 | Oughton, Jr. | 307/64 |

FOREIGN PATENT DOCUMENTS

| | | |
|---|---|---|
| EP | 1 391 300 | 2/2004 |
| JP | 2-125312 | 5/1990 |
| JP | 8-171919 | 7/1996 |
| JP | 8-200155 | 8/1996 |
| JP | 10-94174 | 4/1998 |
| JP | 11-41816 | 2/1999 |
| JP | 11-41819 | 2/1999 |
| JP | 11-262184 | 9/1999 |
| JP | 2002-70606 | 3/2002 |

\* cited by examiner

*Primary Examiner*—Robert L. DeBeradinis
(74) *Attorney, Agent, or Firm*—Oblon, Spivak, McClelland, Maier & Neustadt, P.C.

(57) ABSTRACT

A power supply system for supplying power to a load is provided. The system comprises power-line carriers for supplying power to the load, and a plurality of power supply units the outputs of which are parallelly connected to power-line carriers. Each of the power supply unit comprises a generator; an inverter for converting a voltage generated by the generator into an AC voltage and outputting the AC voltage; an inverter control unit for controlling the inverter, and a connection apparatus for connecting the AC voltage outputted from the inverter to the power-line carriers. The inverter controller comprises a load sharing adjuster for adjusting a shared load current supplied from the power supply unit, so that at least one of the power supply units in operation can operated at its rating condition, thereby realizing an efficiency operation.

11 Claims, 7 Drawing Sheets

ELECTRIC POWER SUPPLY SYSTEM

TECHNICAL FIELD

The present invention relates to an electric power supply system, and more particularly, to a system which operates a plurality of power supply units each having a small generator are driven in parallel to supply electric power to a load.

PRIOR ART

In recent years, regionally distributed power supplies have drawn attention due to the liberation of the electric power market driven by electric power deregulation. In a small gas turbine generator equipment, which is one kind of regionally distributed power supplies, a gas turbine engine is supplied with a fuel and compressed air and driven at extremely high speeds. During operation, a generator directly coupled to the gas turbine engine generates AC power, the frequency of which is significantly higher than the frequency of 50 Hz or 60 Hz of commercial AC power supply lines. Therefore, the output AC power is rectified by a converter for transformation into DC power, and the DC power is converted again by an inverter into AC power which conforms to the frequency, voltage, and phase of power on the commercial AC power supply lines, before it is distributed to loads.

Such a small generator equipment is typically used by small-scale electric power consumers such as stores. Therefore, such small generator equipments should preferably be automatically operated in most circumstances, and can be stably driven. Further, such small generator equipments can preferably be linked to commercial AC power supply lines, and flexibly accommodate fluctuations in load.

A system has been developed in which a plurality of small power supply units connected in parallel are driven or operated so as to accommodate fluctuations in load. In such a system, particularly when it is autonomously operated without linkage to commercial AC power supply lines, it can be operated only by matching the plurality of parallelly driven power supply units with each other in frequency, phase, and voltage, independently of the commercial AC power supply. In such a situation, it is not preferable, from a viewpoint of mechanical efficiency for a plurality of parallelly connected power supply units to be unified so as to have the same standard and characteristics to uniformly share a load. This is because engines associated with the power supply units should be operated at their rating by preference for increasing the efficiency of the engines. Therefore, when two power supply units are operated in parallel, it is preferable that one is driven to output a rated power, while the other one is operated for adjustment to provide the remaining demanded power. Further, the power generators are preferably operated at their rating in rotation such that mechanical loads in the generators are uniformed.

SUMMARY OF THE INVENTION

The present invention has been made in view of the circumstances described above, and it is an object of the invention to provide a power supply system which comprises a plurality of power supply units connected in parallel, wherein a control method is changed in the same control configuration to conduct a synchronized operation of the power supply units at high reliability, both in a linkage operation with the commercial AC power supply line and in a non-linkage operation (autonomous operation).

It is another object of the present invention to provide a power supply system which comprises a plurality of power supply units connected in parallel, wherein the power supply system can be controlled such that at least one power supply unit is automatically driven at its rating, and the remainders are operated for adjusting the output.

To achieve the objects mentioned above, the present invention provides a power supply system which includes a plurality of power supply units, the outputs of which are parallelly connected to power-line carriers leading to a load, in which each of the power supply unit comprises:

a generator;

an inverter for converting a voltage generated by the generator into an AC voltage and outputting the AC voltage;

an inverter control unit for controlling the inverter, comprising a load sharing adjuster for adjusting a shared load current supplied from the power supply unit; and a connection section for connecting the AC voltage output from the inverter to the power-line carriers.

In one embodiment of the power supply system according to the present invention described above, the inverter of each power supply unit comprises an AC/DC converter for converting an AC voltage generated by the generator into a DC voltage, a booster for boosting the converted DC voltage, and a DC/AC converter for converting the boosted DC voltage to an AC voltage to be output. The load sharing adjuster of the inverter control unit controls the booster of the inverter to output a constant DC voltage from the booster when the current outputted from the DC/AC converter is equal to or less than a predetermined current value which is somewhat less than a rated AC current, and to output a DC voltage from the booster which gradually decreases as the current increases when the current outputted from the DC/AC converter is more than the predetermined current. In this event, the respective load sharing adjusters of the plurality of power supply units preferably control the associated boosters to output constant DC voltages which are different to each other.

In another embodiment of the power supply system according to the present invention, the inverter of each power supply unit comprises an AC/DC converter for converting a voltage generated by the generator into a DC voltage, a booster for boosting the converted DC voltage, and a DC/AC converter for converting the boosted DC current into an AC voltage to be output. The load sharing adjuster of the inverter controls the DC/AC converter of the inverter to output a constant AC voltage from the DC/AC converter when the current outputted from the DC/AC converter is equal to or less than a predetermined current value which is somewhat less than a rated AC current value, and to output an AC voltage which gradually decreases as the current increases from the DC/AC converter when the current outputted from the DC/AC converter is more than the predetermined current. In this event, the respective load sharing adjusters of the plurality of power supply units preferably control the associated DC/AC converters to output constant DC voltages which are different from one another.

In a further embodiment of the power supply system according to the present invention described above, the inverter of each power supply unit comprises an AC/DC converter for converting a voltage generated by the generator into a DC voltage, a booster for boosting the converted DC voltage, and a DC/AC converter for converting the boosted DC current into an AC voltage to be output. The load sharing adjuster of the inverter controls both the booster and DC/AC converter to output a constant DC voltage from the booster and output a constant AC voltage from the DC/AC converter when the current output from the DC/AC converter is equal to or less than a predetermined current which is somewhat less than a rated AC current, and to output a DC voltage which gradually decreases as the current increases from the booster and output an AC voltage which gradually decreases from the AC/DC converter when the current outputted from the DC/AC converter is more than the predetermined current. In this event, the respective load sharing adjusters of the plurality of power supply units preferably control the associated boosters to output constant DC voltages which are different to each other, and control the associated DC/AC converters to output constant AC voltages which are different to each other.

To achieve the above object, in a second aspect, the present invention provides a power supply system for supplying power to a load, which comprises a plurality of power supply units, the outputs of which are parallelly connected to a power-line carrier to the load, wherein each of the power supply units comprises:

a generator;
an inverter for converting a voltage generated by the generator into an AC voltage and outputting the AC voltage;
an inverter control unit for controlling the inverter, comprising a first synchronization controller operable in a linkage operation with an external AC power supply, for detecting a voltage of the external AC power supply to control the inverter so that the AC voltage outputted from the inverter is in phase with the voltage of the external AC power supply; and
a connection section for connecting the AC voltage outputted from the inverter to power-line carriers; and
a multiple power unit controller for controlling the plurality of power supply units to individually start and stop and for controlling outputs of the respective power supply units.

In one embodiment of the power supply system according to the second aspect of the present invention, each of the power supply units further comprises means for generating an autonomous operation detection synchronizing signal, an autonomous operation detector for detecting, during a predetermined time period from the output timing of the autonomous operation detection synchronizing signal, whether or not the power supply unit is disconnected from the external AC power supply and is in autonomous operation, means for transmitting the autonomous operation detection synchronizing signal to the other power supply units, and means for receiving the autonomous operation detection synchronizing signals from the other power supply units, wherein all the power supply units in operation can conduct the autonomous operation detection at the same timing.

In another embodiment of the power supply system according to the second aspect of the present invention, at least one power supply unit further comprises means for generating the autonomous operation detection synchronizing signal, an autonomous operation detector for detecting, during a predetermined time period from the output timing of the autonomous operation detection synchronizing signal, whether or not the power supply unit is disconnected from the external AC power supply and is in autonomous operation, and means for transmitting the autonomous operation detection synchronizing signal to the other power supply units, wherein all the power supply units in operation can conduct the autonomous operation detection at the same timing. Also, the autonomous operation detector of each power supply unit is configured to function as a power failure detector for detecting a failure of the external AC power supply during a linkage operation with the external AC power supply.

In a further embodiment of the power supply system according to the second aspect of the present invention, the system further includes synchronizing signal lines connected in common to the outputs of the plurality of power supply units, and the inverter control unit of each of the power supply units comprises a second synchronization controller. The second synchronization controller comprises a synchronizing signal generator circuit for generating a synchronizing signal at a first period which is in synchronism with the AC voltage outputted from the associated inverter. The synchronizing signal generator circuit generates the synchronizing signal having a first time period in response to a reception of the synchronizing signal generated thereby or the synchronizing signal outputted onto the synchronizing signal lines from the synchronizing signal generator circuit of another power supply unit.

In another embodiment of the power supply system according to the second aspect of the present invention, each power supply unit further includes a waveform detector for detecting a waveform of an AC voltage at the connection section, wherein the autonomous operation detector of each power supply unit is adapted to shift the frequency of the AC voltage outputted from the associated power supply unit in a positive or a negative direction, and then in the negative or positive direction for a predetermined time period from the generation of the autonomous operation detection synchronizing signal, and determines during the predetermined period, that the external AC power supply is shut off when the waveform detected by the waveform detector has a frequency other than the frequency of the external AC power supply.

In a further embodiment of the power supply system according to the second aspect of the present invention, the inverter control unit of each power supply unit further comprises a synchronization controller for synchronizing the phase of the AC voltage outputted from the associated inverter to the phase of the AC voltage output from the inverter of another power supply unit or to the phase of the AC voltage of the external AC power supply. In this configuration, the power supply system further includes synchronizing signal line connected in common to the plurality of power supply units. The synchronizing controller of each power supply unit preferably comprises a synchronizing signal generator circuit for generating a synchronizing signal having a first time period synchronized to the AC voltage outputted from the associated inverter and outputting the synchronizing signal onto the synchronizing signal line. The synchronizing signal generator circuit generates the synchronizing signal having the first period from a reception timing of the synchronizing signal generated thereby or the synchronizing signal outputted onto the synchronizing signal line from the synchronizing signal generator circuit of another power supply unit. Also, each power supply unit further includes a waveform detector for detecting the waveform of an AC voltage at the connection section, and an external power supply shut-off detector for detecting whether or not the external AC power supply is shut off, wherein the external power supply shut-off detector of each power supply unit periodically shifts the frequency of the AC voltage outputted from the associated power supply unit in a positive or a negative direction and then in the negative or positive direction for a predetermined time period, and determines that the external AC power supply is shut off when the waveform detected by the waveform detector has a frequency other than the frequency of the external AC power supply during the predetermined period.

To achieve the above object, in a third aspect, the present invention provides a power supply system for supplying electric power to a load, the power supply system comprising:

power-line carriers for supplying electric power to a load in at least one of a linkage operation with an external AC power supply and an autonomous operation in which the power supply system is disconnected from the external AC power supply;

a plurality of power supply unit, outputs of which are parallelly connected to the power-line carriers, each of the plurality of power supply units comprising:
a generator;
an inverter for converting a voltage generated by the generator into an AC voltage and outputting the AC voltage;
an inverter control unit for controlling the inverter, comprising a synchronization controller for synchronizing the phase of the AC voltage outputted from the inverter to the phase of a predetermined AC voltage; and
a connection section for supplying the AC voltage outputted from the inverter to the power-line carriers; and
a multiple power unit controller for controlling each of the power supply units to start and stop and for controlling the output of each power supply unit.

In one embodiment of the power supply system according to the third aspect of the present invention, the predetermined AC voltage is a voltage from the external AC power supply or one power supply unit selected from the remaining power supply units. The synchronization controller of each power supply unit is adapted to monitor the AC voltage on the power-line carriers in autonomous operation to synchronize the phase of the AC voltage output from the associated inverter to the phase of the AC voltage.

In another embodiment of the power supply system according to the third aspect of the present invention, the multiple power unit controller is adapted to output a control signal for controlling the operation of the plurality of power supply units onto the power-line carriers through a power-line carrier modem.

In a further embodiment of the power supply system according to the third aspect of the present invention, the system further comprises communication lines such as wireless communication lines, optical communication lines, a digital bus, and the like, wherein the multiple power unit controller is adapted to supply a control signal for controlling the operation of the plurality of power supply units to the plurality of power supply units through the communication lines.

In the foregoing configurations, the multiple power unit controller may generate the control signal based on control information supplied thereto from an external device through a communication means. Also, the control signal outputted from the multiple power unit controller preferably comprises a signal for controlling the respective power supply units to output AC voltages which have voltage values different from one another.

In another embodiment of the power supply system according to the third aspect of the present invention, the inverter of each power supply unit comprises an AC/DC converter for converting a voltage generated by the generator into a DC voltage, a booster for boosting the converted DC voltage, and a DC/AC converter for converting the boosted DC voltage into an AC voltage to be output.

Then, in this event, the power supply system further includes means for presetting different values from one another for the AC voltages outputted respectively from the plurality of power supply units. The inverter of each power supply unit is preferably adapted to (i) fix the control of the DC/AC converter of the associated inverter at the time when the AC current or power output from the power supply unit exceeds the preset value; or (ii) fix the control of the booster of the associated inverter at the time when the AC current or power outputted from the power supply unit exceeds a set value; or (iii) fix the control of both of the AC/DC converter and the booster of the associated inverter at the time when the AC current or power outputted from the power supply unit exceeds the preset value.

Also, the multiple power unit controller may comprise means for outputting control signals indicative of voltage values such that the plurality of power supply units provide AC voltages having different values to each other.

In a further embodiment of the power supply system according to the third aspect of the present invention, the inverter control unit of each power supply unit further comprises a load sharing adjuster for adjusting a shared load current supplied by the associated power supply unit. Then, in a case that the inverter of each power supply unit comprises an AC/DC converter for converting a voltage generated by the generator into a DC voltage, a booster for boosting the converted DC voltage, and a DC/AC converter for converting the boosted DC voltage into an AC voltage to be output, the load sharing adjuster controls both the booster and DC/AC converter of the inverter to output a constant DC voltage from the booster and output a constant AC voltage from the DC/AC converter when a current outputted from the DC/AC converter is equal to or less than a predetermined current which is equal to or less than a rated AC current, and to output a DC voltage from the booster which gradually decreases as the current increases and output an AC voltage from the DC/AC converter which gradually decreases as the current increases, when the current outputted from the DC/AC converter is equal to or more than the predetermined current.

Also, the inverter of each power supply unit preferably comprises means for controlling a DC voltage from the booster of each power supply unit not to be less than a predetermined value to set a lower limit for the AC voltage output from the power supply unit, in the embodiment in which the inverter of each power supply unit includes an AC/DC converter for converting a voltage generated by the generator into a DC voltage, a booster for boosting the converted DC voltage, and a DC/AC converter for converting the boosted DC voltage into an AC voltage to be output.

In the power supply system according to the present invention, the generator of each power supply unit is preferably a generator directly coupled to a gas turbine engine.

EMBODIMENTS OF THE INVENTION

Figure 1:
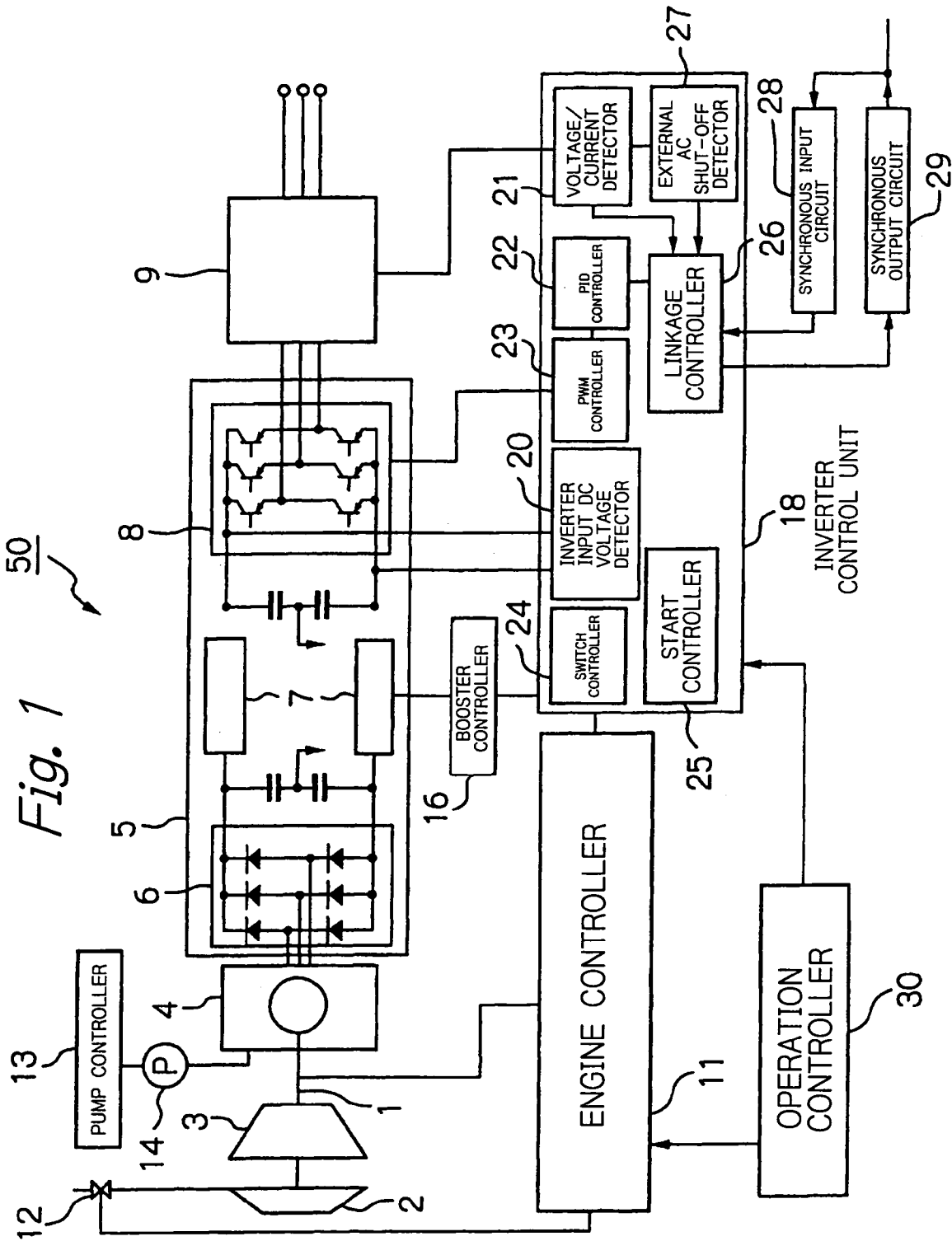
FIG. 1 is a block diagram illustrating one embodiment of a gas turbine power supply unit which can be employed for a power supply unit included in a power supply system of the present invention.

Referring to FIG. 1, it will be explained a power supply unit 50 including gas turbine generators and a power converter, which is applicable to a power supply system of the present invention.

As is known in the art, a gas turbine generator is characterized by generating a large amount of power, though small in size, under extremely high speed rotation of a gas turbine engine and a generator directly coupled to the engine. More specifically, the gas turbine generator comprises a gas turbine blade 2, a compressor blade 3, and a rotor of a generator 4, which are coupled to a rotary shaft 1, as illustrated in FIG. 1. Specifically, the gas turbine generator has an integral structure of a gas turbine engine which is rotated at extremely high speeds through the combustion of an air/fuel mixture, a compressor for compressing air to be supplied to a gas turbine, and the DC brushless generator 4 having a stator around the rotor.

In the gas turbine generator, a liquid or a gaseous fuel is supplied to a combustion chamber of the gas turbine engine from a fuel feeder (not shown), through a fuel control valve 12, and the fuel is mixed with compressed air and is burnt to drive the gas turbine blade 2 to rotate. A combustion gas which has passed through the gas turbine blade 2 is heat exchanged with air compressed by the compressor blade 3 at a regenerator, and emitted to the outside. The compressed air previously heated by the regenerator is supplied to the combustion chamber, and mixed with the fuel and burnt to rotate the gas turbine blade 2 at high speeds. In this way, the gas turbine generator can provide a large amount of power though it is small in size.

The generator 4 is a permanent magnet type generator in which permanent magnets surround the rotor. A stator is disposed outside the rotor, the winding of which outputs a voltage induced in association with the rotation of the rotor. The employment of the permanent magnet type generator eliminates a current loss on the rotor side, and can therefore achieve a high generation efficiency suitable for high speed operation.

Electric power generated by the generator 4 directly coupled to the rotary shaft 1 of the gas turbine blade 2 which rotates at a high speed is rectified by an AC/DC converter circuit (full-wave rectifier circuit) 6 in an inverter 5 which forms part of the power converter. The resulting DC power is boosted by a booster circuit (DC-to-DC converter) 7, and the boosted DC power is converted, by a DC-to-AC inverter circuit 8, to AC power which has the same frequency, voltage, and phase as those of an external AC power supply such as a commercial AC power supply by a DC-to-AC inverter circuit 8. The output of the inverter 5 is delivered to a load through a connection section 9.

An engine controller 11 controls the opening of the fuel control valve 12 upon start-up and during a steady-state operation. A booster controller 16 controls a DC output voltage boost operation by the booster circuit 7 of the inverter 5. A pump 14 and a pump controller 13 are provided to lubricate and cool down the generator 4 using oil.

The booster circuit 7 and inverter circuit 8 of the inverter 5 are controlled by a microcomputer-based inverter control unit 18. As illustrated in FIG. 1, the inverter control unit 18 comprises an inverter input DC voltage detector 20 for detecting a DC output of the booster circuit 7, i.e., a DC voltage applied to the inverter circuit 8; a voltage/current detector 21 for detecting a voltage of an external AC power supply line, an output current of the inverter 5, and the like; a PID controller 22; and a PWM controller 23 for controlling the inverter circuit 8 in accordance with pulse-width modulation. An AC output with an arbitrary voltage, frequency, and phase is formed under the control of the PWM controller 23. Further, the inverter control unit 18 comprises a switch controller 24 for controlling a variety of switches to open and close; a start controller 25 for controlling the starting up operation of the power supply unit; a link controller 26 for controlling a linked synchronous operation with an external AC power line through the connection section 9 and for performing a synchronous operation with another power supply unit through a synchronous input circuit 28 and synchronous output circuit 29; and an external AC shut-off detector 27 for detecting whether an external AC power supply is shut off, i.e., for detecting whether or not the gas turbine generator is disconnected from the AC power supply and is in autonomous operation (for example, due to a power failure or the like).

An operation controller 30 supplies a start/stop signal to the engine controller 11 and inverter control unit 18 to control the power supply unit 50 to start/stop, and performs control for setting AC power (voltage and current) and its frequency to be output from the power supply unit 50.

Figure 2:
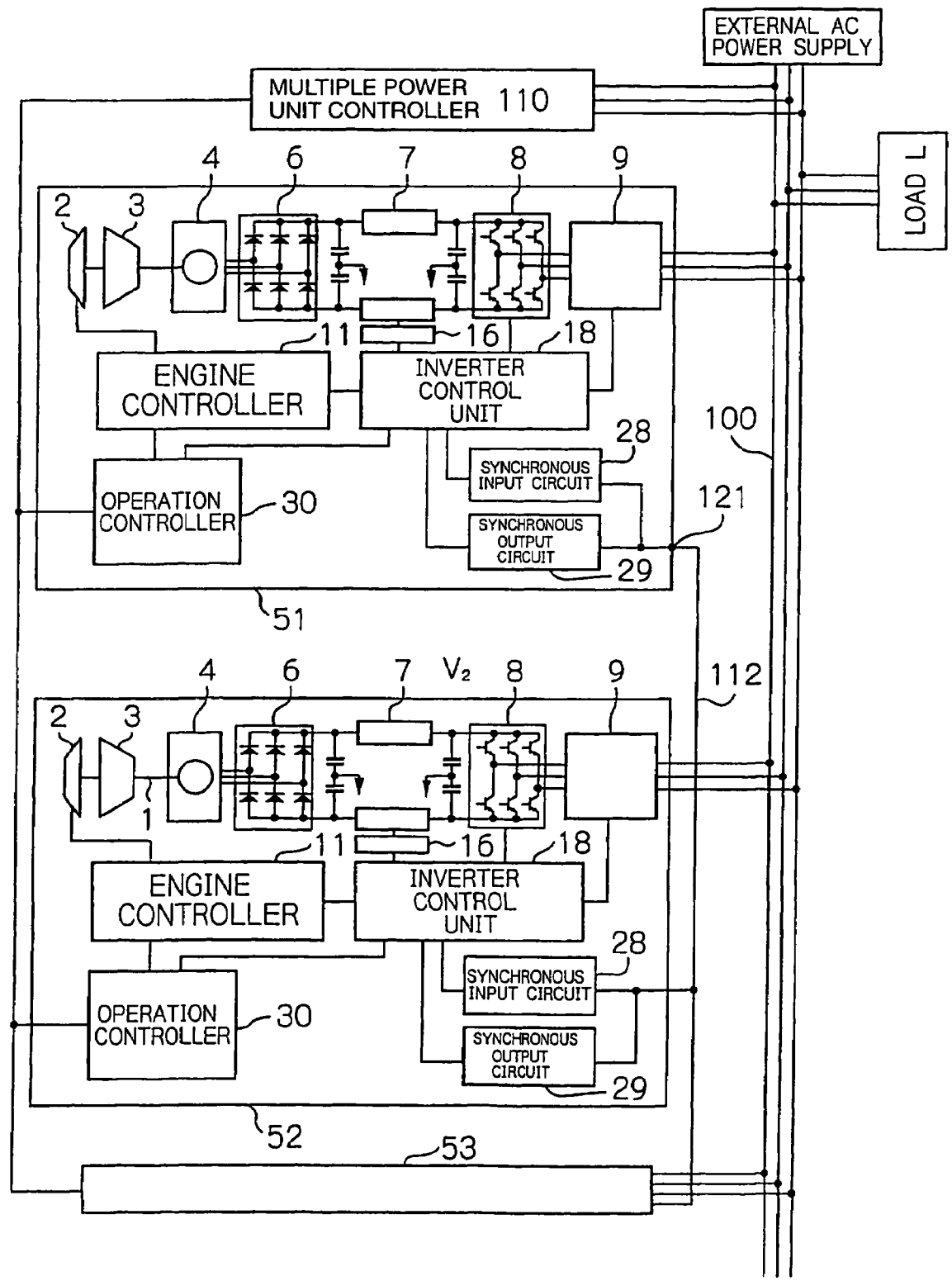
FIG. 2 is a block diagram illustrating a configuration of a power supply system which includes a plurality of the gas turbine power supply units illustrated in FIG. 1, connected in parallel according to one embodiment of the present invention.
Figure 3:
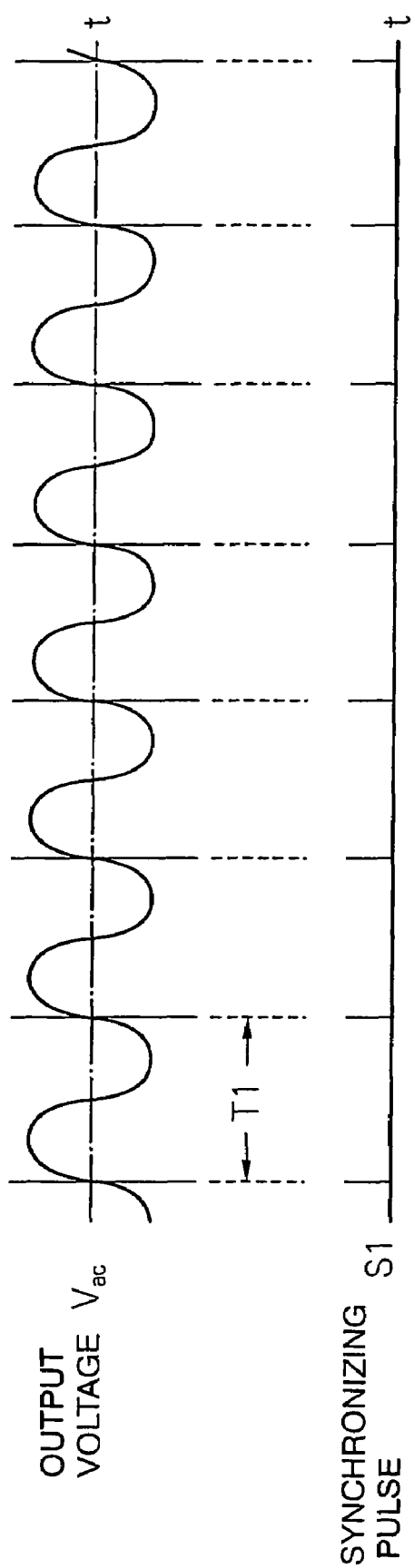
FIG. 3 is a waveform chart representing the relationship between a voltage output from an inverter and a synchronizing pulse generated by a linkage controller when the gas turbine power supply units are connected in parallel in an autonomous operation in which the power supply system illustrated in FIG. 2 is disconnected from an external AC power supply such as a commercial AC power supply.

FIG. 2 illustrates an embodiment of the power supply system which comprises a plurality of power supply units connected in parallel according to the present invention. In FIG. 2, each of power supply units 51-53 has the same configuration as that of the power supply unit 50 which employs the gas turbine generator as illustrated in FIG. 1. Power output terminals of the power supply units 51-53 are connected to a bus 100, which is in turn connected to a load L, i.e., a commercial AC power line. Each of the power supply units 51-53 has an inverter 5 (FIG. 1) which rectifies and smoothes the output of the generator 4 by a converter 6, boosts the rectified output by a booster circuit 7, and converts the boosted output to an AC voltage by an inverter 8, under control of the inverter control unit 18, as previously described in connection with FIG. 1.

A multiple power unit controller 110 controls the power supply units 51-53 to start/stop through an operation controller 30, and control the number of gas turbine power supply units to be operated in response to fluctuations in the load L for accomplishing an efficient operation.

The multiple power unit controller 110 may be provided with a function of generating a control signal for setting AC power and frequency which should be output from the power supply units 51-53 and supplying the control signal to the operation controllers 30 of the respective power supply units 51-53. Such a control signal may be supplied to the operation controller 30 from another device, instead of the multiple power unit controller 110, or from another device through the multiple power unit controller 110. Also, while the system in FIG. 2 is configured such that the control signal from the multiple power unit controller 110 is supplied to the respective power supply units 51-53 in series, the control signal from the multiple power unit controller 110 may be supplied to the respective power supply units 51-53 in parallel.

These power supply units 51-53 are synchronously operated by linkage controllers 26 of the respective power supply units 51-53 which communicate synchronizing pulses to one another through associated synchronous input circuits 28 and synchronous output circuits 29.

Described in greater detail, the linkage controller 26 of each power supply unit has a timer function, so that when the multiple power unit controller 110 supplies an operation command, for example, to the power supply unit 51 during an autonomous operation (or a non-linkage operation with an external AC power supply), the linkage controller 26 of the power supply unit 51 outputs a synchronizing pulse S1 at the time it counts a period T1 (=1/F) corresponding to a frequency F of a voltage Vac which should be output. The generated synchronizing pulse S1 is returned to the linkage controller 26 through the synchronous output circuit 29 and the synchronous input circuit 28, thereby resetting the timer to again start measuring the time. Therefore, in the power supply unit 51, the linkage controller 26 outputs a sequence of synchronizing pulses at the period T1. This sequence of synchronizing pulses is supplied to a PWM controller 23 through a PID controller 22, thereby permitting the inverter 5 of the power supply unit 51 to output an AC voltage which has the period T1, in synchronism with the synchronizing pulses S1.

The sequence of synchronizing pulses S1 generated by the linkage controller 26 of the power supply unit 51 in operation is also supplied to the synchronous input circuits 28 of the remaining power supply units 52, 53 through a synchronizing signal line 112. In such a status, the multiple power unit controller 110 supplies an operation command, for example, to the power supply unit 52, the timer of the linkage controller 26 of the power supply unit 52 is reset at the timing when the linkage controller 26 receives the synchronizing pulses S1 from the power supply unit 51 through the synchronous input circuit 28 of the power supply unit 52. Then, the linkage controller 26 of the power supply unit 52 outputs the synchronizing pulses at the period T1 from the timing when the synchronizing pulse S1 is received. In this way, the linkage controller 26 of the power supply unit 52 can also output a sequence of synchronizing pulses at a timing synchronized to the power supply unit 51, thereby permitting the power supply unit 52 to output an AC voltage in synchronism with the sequence of synchronizing pulses.

In this way, all the power supply units 51-53 can output the waveforms at the same phase. Even if one of the power supply units stops operating due to a failure or the like, a plurality of the remaining operative power supply units can be still operated in synchronization.

When the power supply system of FIG. 2 is operated in a linkage relationship with an external AC power supply, the respective power supply units generate output voltages synchronized with the external AC supply voltage in the following manner. When the multiple power unit controller 110 supplies an operation command, for example, to the power supply unit 51, a voltage/current detector 21 of the inverter control unit 18 in the power supply unit 51 detects a zero-cross point of the voltage of the external AC power supply, which is supplied to the linkage controller 26. In this way, the linkage controller 26 can detect the period of the external AC power supply voltage, so that the power supply unit 51 can supply an AC voltage in synchronism with the external AC power supply. Then, as an operation command is supplied to the remaining power supply units 52, 53, the respective power supply units 52, 53 detect a zero-cross point of the external AC power supply voltage in a similar manner, and can thereby output AC voltages in synchronism with the external AC power supply.

Figure 4:
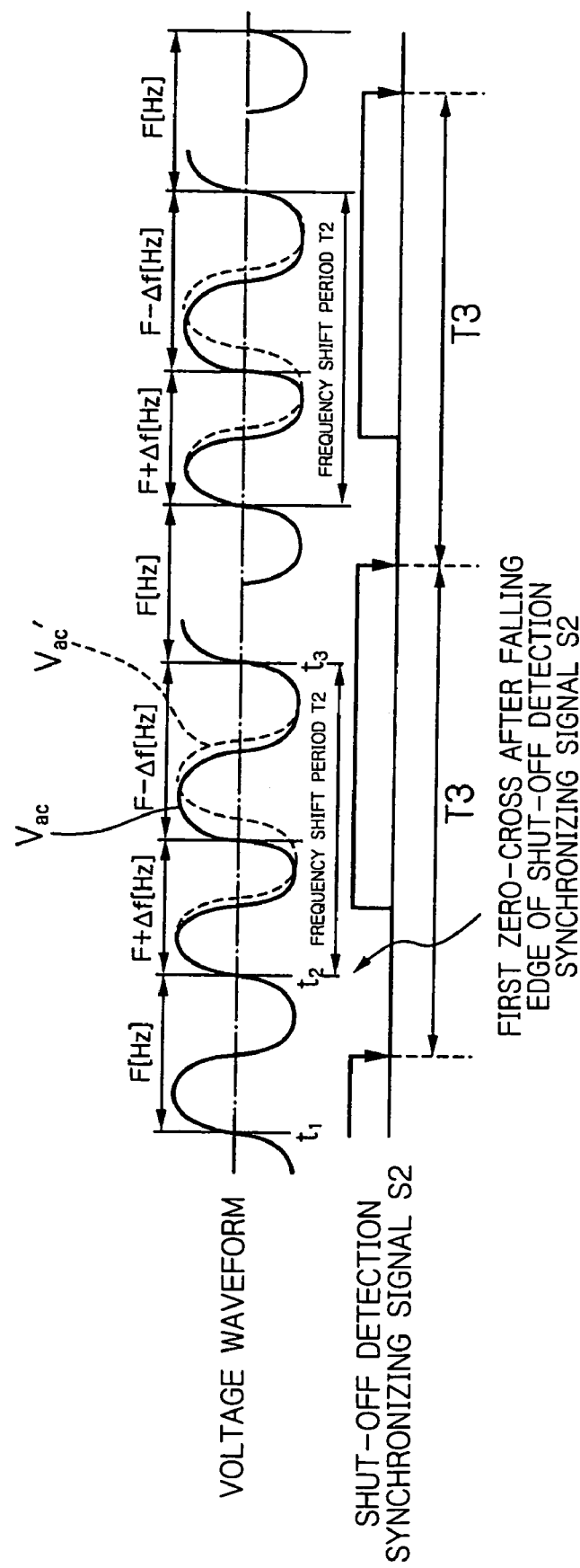
FIG. 4 is a waveform chart for explaining the principles for detecting whether an external AC power supply such as a commercial AC power supply is shut off (for example, due to a power failure or the like) during a linkage operation with the external AC power supply, in the power supply system illustrated in FIG. 2, i.e., that the system is in autonomous operation.

Next, a determination as to whether the external AC power supply is shut off will be described with reference to FIG. 4. The upper waveforms in FIG. 4 represent a voltage Vac' of the external AC power supply and a voltage waveform Vac outputted from one of the power supply units of the power supply system in the present invention. The lower waveform in FIG. 4 represents a shut-off detection synchronizing signal S2 for detecting that the external AC power supply is shut off. The shut-off detection synchronizing signal S2 is generated in the linkage controller 26 of the power supply unit, for shifting the frequency F of the voltage outputted from the power supply unit over a predetermined period. In FIG. 4, time periods in which the frequency F is shifted in the positive direction and the negative direction are schematically represented as one cycle and one cycle of the AC voltage, respectively, but it goes without saying that each of the periods (frequency shift periods) includes a plurality of cycles of the AC voltage.

When the external AC power supply does not fail during a linkage operation, the output voltages of the power supply units are in synchronism with the voltage of the external power supply system, so that these voltages have the same waveform, as shown in a time period t1-t2 in FIG. 4. Therefore, even if the external AC power supply fails, the power failure cannot be detected because the output voltages of the power supply units are at the same output frequency as that of the external AC power supply. To overcome this problem, over a predetermined period T2 from a zero-cross point t2 to a zero-cross point t3 after a shut-off detection synchronizing signal S2 is generated from the linkage controller 26 (after an end point of the signal S2 in FIG. 4), the cycle of the output voltage Vac from the power supply unit is shifted in the positive direction (or the negative direction) and then shifted in the negative direction (or the positive direction). The frequency may be shifted by an amount, for example, equal to about 2% of the detected frequency of the external AC power supply.

The shut-off detection synchronizing signal S2 generated in the linkage controller 26 is returned to the linkage controller 26 through the synchronous output circuit 29 and synchronous input circuit 28, thereby resetting another timer for measuring a period T3 to again start measuring the period T3. This shut-off detection synchronizing signal S2 is supplied to the PWM controller 23 through the PID controller 22, so that the inverter 5 of the power supply unit 51 can shift the output frequency for the period T2 at a timing synchronized to the shut-off detection synchronizing signal S2.

Then, the external AC shut-off detector 27 determines whether an AC voltage detected by the voltage/current detector 21 during the frequency shift period T2, has a shifted frequency. When determining that the frequency is shifted, the external AC shut-off detector 27 determines that the external AC power supply has failed.

The shut-off detection synchronizing signal S2 generated by the linkage controller 26 of the power supply unit 51 in operation is also supplied to the synchronous input circuits 28 of the other power supply units 52, 53 through the synchronous output circuit 29 and synchronizing signal line 112. When an operation command is supplied from the multiple power unit controller 110, for example, to the power supply unit 52 in such a state, the timer for measuring the period T3 is reset at the time the linkage controller 26 of the power supply unit 52 receives the shut-off detection synchronizing signal S2 through the synchronous input circuit 28 from the power supply unit 51. Then, the linkage controller 26 of the power supply unit 52 outputs the shut-off detection synchronizing signal S2 every period T3 from the time at which it receives the shut-off detection synchronizing signal S2. In this way, the linkage controller 26 of the power supply unit 52 can also output the shut-off detection synchronizing signal S2 at a timing synchronized with the power supply unit 51, and can therefore determine at the same timing whether or not the external AC power supply has failed.

It is not always required that all the power supply units contain the aforementioned means for generating the shut-off detection synchronizing signal for detecting a failure in the external AC power supply. Instead, a power supply unit previously determined to be a master unit, or the multiple power unit controller 110 may generate and output the shut-off detection synchronizing signal.

Figure 5:
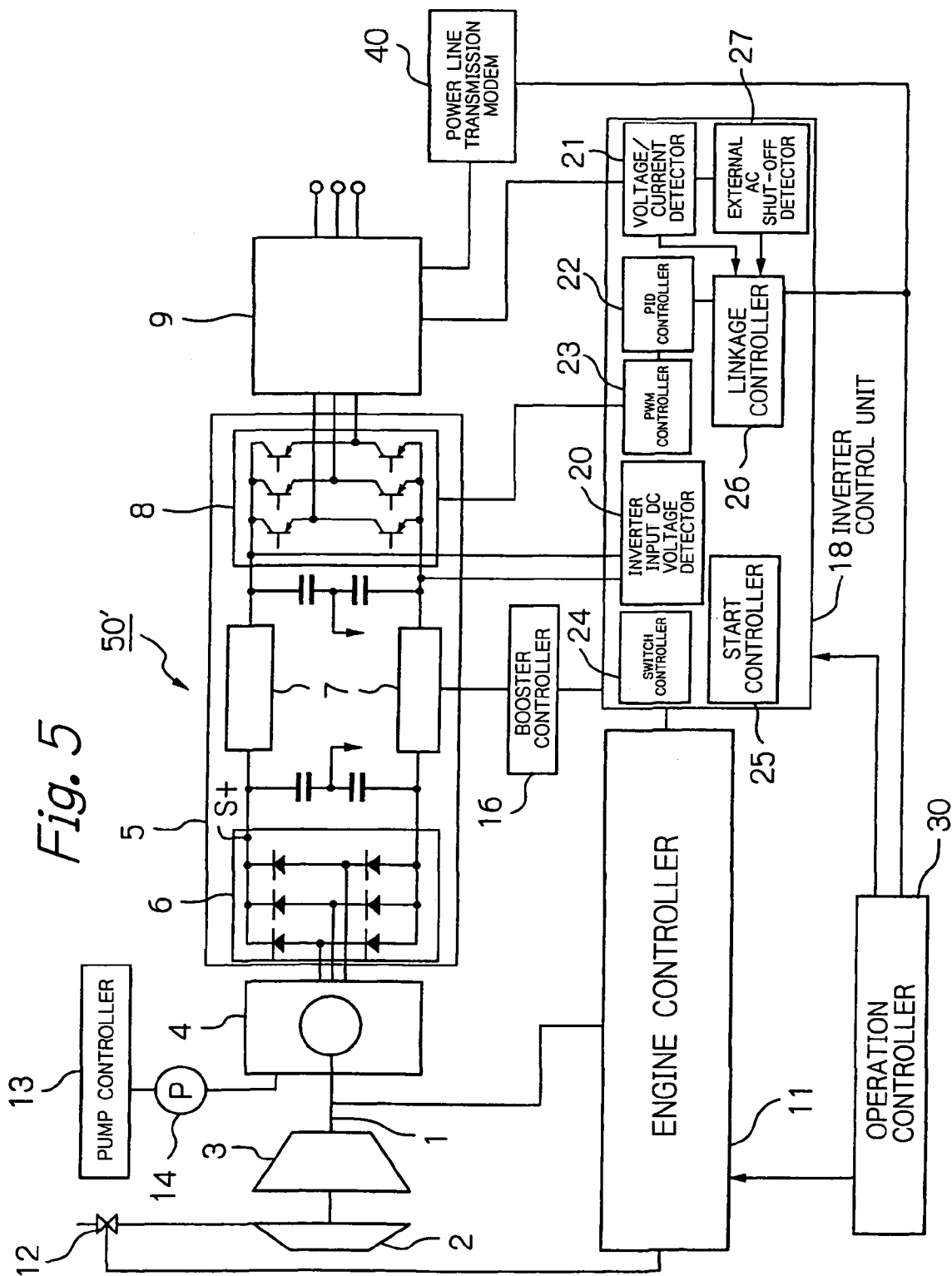
FIG. 5 is a block diagram illustrating a configuration of another embodiment of the gas turbine power supply unit which can be employed as the power supply unit included in the power supply system of the present invention.
Figure 6:
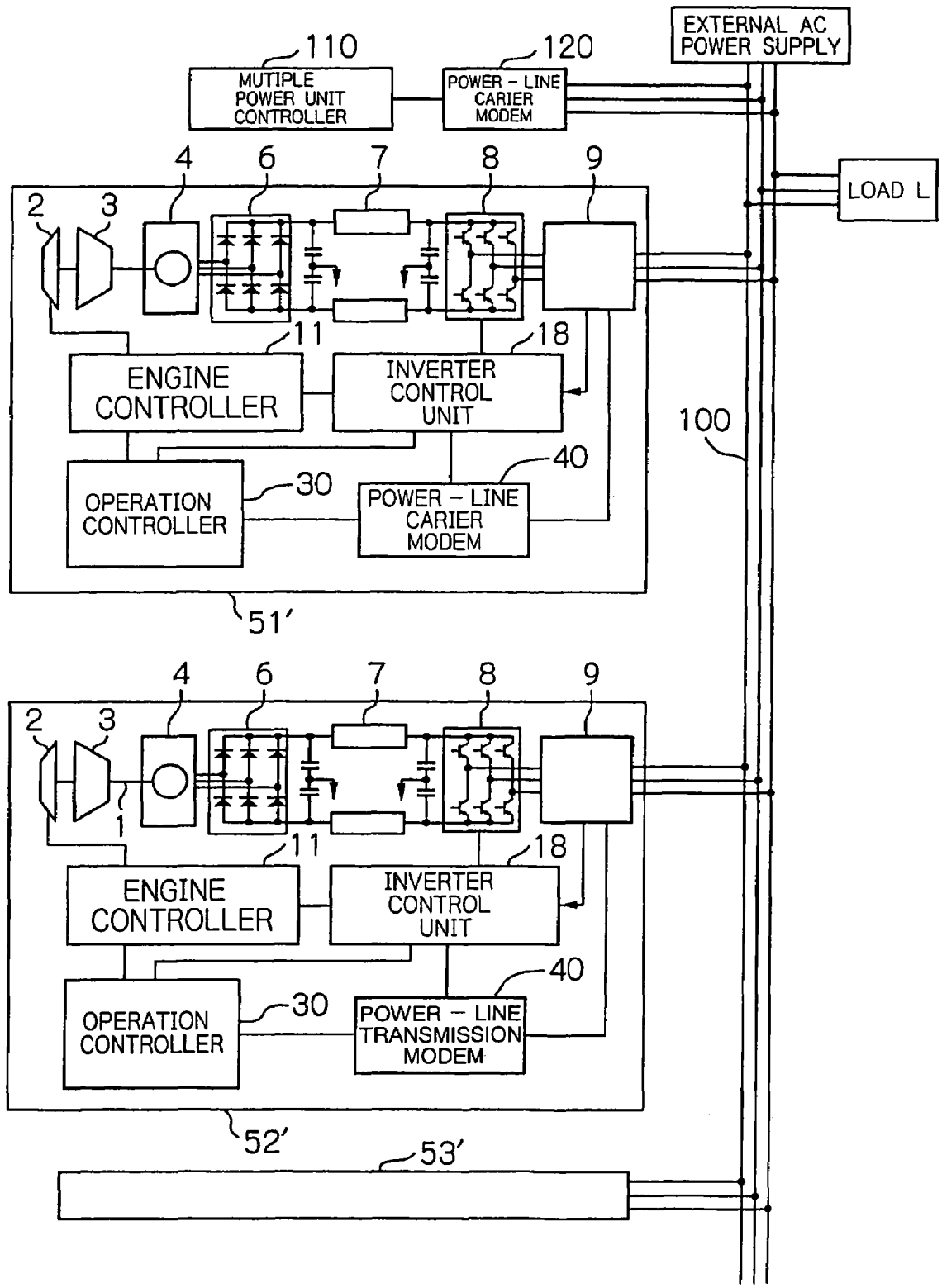
FIG. 6 is a block diagram illustrating the power supply system which includes a plurality of gas turbine power supply units illustrated in FIG. 5, connected in parallel according to another embodiment of the present invention.

Next, a second embodiment of the power supply system according to the present invention will be described with reference to FIGS. 5 and 6. FIG. 5 illustrates a power supply unit 50' which can be applied to the power supply system of the second embodiment, and FIG. 6 illustrates the power supply units 51'-53', identical to that illustrated in FIG. 5, which are connected in parallel to lines of an external AC power supply, i.e., a bus 100.

The power supply unit 50' illustrated in FIG. 5 is the same as the power supply unit 50 illustrated in FIG. 1 in configuration except that a power-line carrier modem 120 is provided in the unit 50' instead of the synchronous input circuit 28 and synchronous output circuit 29 of the unit 50. Also, as illustrated in FIG. 6, the power supply system according to the second embodiment also comprises a power-line carrier modem 120 provided between the multiple power unit controller 110 and bus 100.

The power-line carrier modem 40 included in each of the power supply units transmits and receives the synchronizing pulse S1 and shut-off detection synchronizing signal S2 output from the linkage controller 26 to and from the other power supply units through the connection section 9 and bus 100. The modem 40 further receives control signals transmitted from the multiple power unit controller 100 onto the bus 100 through the power-line carrier modem 120 by way of the connection section 9.

The control signals transmitted from the multiple power unit controller 110 through the power-line carrier modem 120 and bus 100 include a command signal for starting/stopping the power supply units 51'-53' and set values for the power, frequency and the like which should be output from the respective power supply units 51'-53'. Upon receipt of such control signals at the operation controller 30 and the linkage controller 26 of the inverter control unit 18 through the connection section 9 and power-line carrier modem 40, each of the power supply units 51'-53' conducts a control operation based on the control signals.

While the foregoing description has been made with respect to an example of transmitting the control signals from the multiple power unit controller 110 through the power-line carrier, i.e., bus 100, the wired communication means using the bus 100 may be replaced with an appropriate communication means such as a wireless communication means, an optical communication means, a digital bus, and the like for communicating the control signals. Further alternatively, the multiple power unit controller 110 may receive a variety of control signals for controlling the power supply system through an arbitrary control line, generate signals for controlling the respective power supply units based on the received control signals, and supply the generated signals to the respective units through the power-line carrier modem 120 and bus 100 (or an appropriate communication means).

In the power supply systems according to the first and second embodiments described above, the multiple power unit controller 110 determines the number of power supply units to be operated on the basis of the power which should be supplied to a load, and supplies operation commands to the power supply units so that the respective power supply units are run or stop in accordance with the commands. In the following, referring to FIGS. 1 and 2 which have been referred to in describing the first embodiment, a power supply system will be described according to a third embodiment of the present invention, where even if the multiple power unit controller 110 is supplying an operation command to all the power supply units 51-53 in an autonomous operation, one or a plurality of power supply units can be automatically driven in response to a necessary load current, while at least one power supply unit can be driven at its rating operation.

Figure 7:
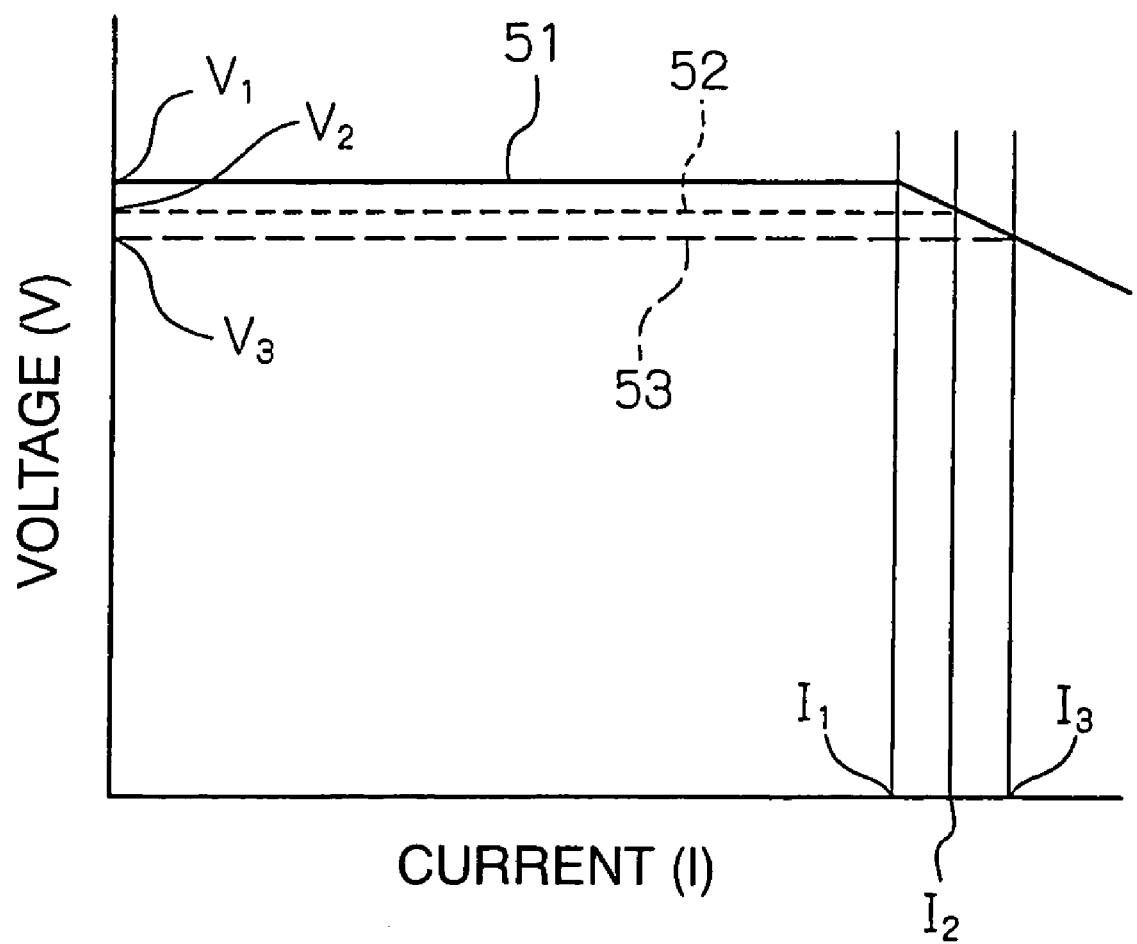
FIG. 7 is a graph representing the current/voltage output characteristics of three gas turbine power supply units, which are set in a method of controlling at least one gas turbine power supply unit to operate at its rating in the power supply system according to the present invention.

In the power supply system according to the third embodiment, as illustrated in FIG. 7, the respective gas turbine power supply units 51-53 are provided with different current/voltage characteristics to each other. Such current/voltage characteristics can be set by an operator or the like, for example, by way of an operation control panel (not shown). The characteristics can be set by using the booster controller 16 which controls the booster circuit 7, or by using the PWM controller 23 which controls the inverter circuit 8, or by conducting the two control operations. The set current/voltage characteristics, serving as control signals, may be supplied from the multiple power unit controller 110 to the power supply units 51-53. As illustrated in FIG. 7, different maximum output voltages, i.e., rated voltages V1-V3 (in this example, V1>V2>V3) are respectively set for the power supply units 51-53. Also, when output load currents exceed predetermined values I1-I3 which are substantially rated current values, respectively, the output voltages are gradually decreased from the rated voltages V1-V3.

Specifically, in the power supply unit 51, the output voltage is constant at V1 irrespective of a magnitude of the load current I when the load current I is equal to or less than a current I1, and is gradually decreased from V1 as the load current I exceeds I1. Likewise in the power supply units 52, 53, while constant output voltages V2, V3 can be provided when the load currents are equal to or less than currents I2, I3, respectively, the respective output voltages are decreased from V2 and V3, respectively, as the load currents exceed I2, I3.

In order to supply a load L connected to the bus 100 with a current I in this state, when the power supply system starts the operation, all the power supply units start operating to generate voltages in response to a start command from the multiple power unit controller 110. In this event, since the rated voltages of the power supply units 51-53 are set V1>V2>V3, the inverter 8 of the power supply unit 51 outputs the highest voltage. Thus, the load current I flowing through the bus 100 is substantially supplied from the power supply unit 51 in an initial stage (when the load current is small), whereas the other power supply units 52, 53 hardly supply the load current.

As the load current I flowing through the bus 100 increases to the current I1 near the rated current of the power supply unit 51, the output voltage from the inverter 5 of the power supply unit 51 gradually decreases from V1 and eventually becomes equal to the output voltage V2 of the inverter 5 in the second generator unit 52 at the time the load current I increases to the current I2, because the characteristics have been set as illustrated in FIG. 7. Thus, as the load current I flowing through the bus 100 exceeds the current I2, the first generator unit 51 operates substantially at its rating to supply the current I2 of the load current, and an overflowing current (I-T2) of the load current flows from the second generator unit 52. Namely, when a current exceeding the rating I1 is to flow from the first power supply unit 51, the output voltage decreases, thus permitting the second power supply unit 52 to supply a current. Therefore, the first generator unit 51 substantially supplies its rated current, and the second power supply unit 52 supplies an overflow portion of the load current exceeding the rated current of the first power supply unit 51.

Then, as the load current I further increases beyond the current I3, the third power supply unit 53 can supply a load current. Thus, the first and second generator units 51, 52 substantially supply their rated currents (I3), while the third power supply unit 53 supplies a portion of the load current exceeding the sum of the rated currents 2×I3 (=I−2×I3). In the way described above, when a load current is equal to or less than the rated current of one power supply unit, the unit alone supplies the load current. As the load current further increases beyond the rated current of the first power supply unit, the second power supply unit 52 supplies the surplus load current. Further, as the load current increases beyond the sum of the rated currents of the two generator units, the third power supply unit 53 supplies the surplus load current.

The above parallel operation can be controlled by controlling the booster circuit 7, or by controlling the inverter circuit 8, or by controlling both the booster circuit 7 and inverter circuit 8. For example, when the currents outputted from the respective power supply units 51-53 exceed the set values I1-I3, respectively, the control of the inverter circuit 8 (or the booster circuit 7) may be fixed at this timing, and the booster circuit 7 (or the inverter circuit 8) may be controlled instead to reduce the output voltages from V1-V3. In this way, the current/voltage characteristics can be accomplished as shown in FIG. 7. Alternatively, the current/voltage characteristics shown in FIG. 7 may be accomplished by fixing the control of one of the booster circuit 7 and inverter circuit 8 and controlling only the other one.

Further, in the power supply units 51-53, while the current set values I1-I3 are used for capturing a timing at which the voltages are reduced, an approximate rated power set value may be used for this purpose instead of the current values. In this event, the characteristics are preferably set such that the power of each power supply unit reaches the set power value in a sloping region of the characteristics shown in FIG. 7. Such set power values are preferably the same for all the power supply units.

By employing the parallel operation strategy as described above, when a supplied load current exceeds the rated current of one power supply unit, one gas turbine power supply unit can be operated substantially at its rating. When the supplied load current exceeds the sum of the rated currents of two power supply units, the two gas turbine power supply units can be operated substantially at their ratings. Thus, the parallel operation can be conducted in an efficient way. Moreover, since a number of power supply units, as required for supplying the load current, are automatically operated in response to the load current, the multiple power unit controller 110 is not required to adjust the number of power supply units to be operated in response to the load current.

When the power supply system is configured to permit an operator to arbitrarily set the current/voltage characteristics as shown in FIG. 7 on an operation control panel of the system, the gas turbine power supply units which exhibit the highest availability factor can be operated in turns to level off the availability factor.

In the embodiments described above, when the outputs of the gas turbines 51-53 are made different as shown in the current/voltage characteristics of FIG. 7, for example, when the power supply unit 51 outputs a lower voltage than the other units, the power from the other units which output higher output voltages may be charged into the power supply unit 51, possibly causing an input DC voltage of the inverter circuit 8 to rise to a predetermined value or higher. Therefore, this input DC voltage should be detected by the inverter input DC voltage detector 20 to control at least one of the booster circuit 7 and inverter circuit 8 such that the input DC voltage does not rise beyond the predetermined voltage value, thereby making it possible to prevent the inverter input DC voltage from rising.

While the first to third embodiments have been described for an example in which three power supply units, based on gas turbine generators, are connected in parallel to supply a load current, it should be apparent that the number of gas turbine power supply units connected in parallel is not limited to three, but an arbitrary plurality of power supply units may be connected in parallel. However, it should be noted that since an increased number of generator units operated in parallel results in a large difference among the input voltages to the inverters 8 which function as DC/AC converters, approximately five power supply units are preferable at most. Also, any power supply unit other than the gas turbine power supply unit may be employed, for example, a power supply unit which is a combination of a generator such as a solar cell, a fuel cell, and the like with an inverter.

While the present invention has been described in connection with the preferred embodiments thereof, it should be apparent to those skilled in the art, by reading the foregoing description, that a variety of modifications can be made thereto.

The invention claimed is:

1. A power supply system for supplying power to a load, comprising:
 a plurality of power supply units, the outputs of which are parallelly connected to power transmission lines to the load, each of the power supply units comprising:
  a generator;
  an inverter for converting a voltage generated by the generator into an AC voltage and outputting the AC voltage;
  an inverter control unit for controlling the inverter, comprising a first synchronization controller operable in a linkage operation with an external AC power supply, for detecting a voltage of the external AC power supply to control the inverter so that the AC voltage outputted from the inverter is in phase with the voltage of the external AC power supply;
  a connection apparatus for connecting the AC voltage outputted from the inverter to power transmission lines;
  means for generating an autonomous operation detection synchronizing signal; and
  an autonomous operation detector for detecting, during a predetermined time period from the output timing of the autonomous operation detection synchronizing signal, whether the power supply system is in the autonomous operation in which the system is disconnected from the external AC power supply, whereby all the power supply units in operation can conduct the autonomous operation detection at the same timing; and a multiple power unit controller for controlling the plurality of power supply units to individually start and stop and for controlling output power of the respective power supply units.

2. A power supply system according to claim 1, wherein each of the power supply units further comprises:
   means for transmitting the autonomous operation detection synchronizing signal to the other power supply units; and
   means for receiving the autonomous operation detection synchronizing signals from the other power supply units.

3. A power supply system according to claim 2, wherein the autonomous operation detector of each of the power supply unit is adapted to function as a power failure detector for detecting a failure of the external AC power supply during a linkage operation with the external AC power supply.

4. A power supply system according to claim 1, wherein at least one power supply unit further comprises:
   means for generating the autonomous operation detection synchronizing signal.

5. A power supply unit according to claim 1, wherein the components of each of the power supply units are unified.

6. A power supply system according to claim 1, wherein the system further comprises a synchronizing signal line connected in common to the plurality of power supply units, and the inverter control unit of each of the power supply units comprises a second synchronization controller, the second synchronization controller comprising:
   a synchronizing signal generator circuit for generating a synchronizing signal having a first cycle which is synchronized with the AC voltage outputted from the associated inverter and outputting the synchronizing signal onto the synchronizing signal line, in which the synchronizing signal generator circuit generates the synchronizing signal having the first cycle from a reception timing of the synchronizing signal generated by itself or the synchronizing signal outputted onto the synchronizing signal line from the synchronizing signal generator circuit of another power supply unit.

7. A power supply system according to claim 1, wherein each of the power supply units further comprises a waveform detector for detecting a waveform of an AC voltage at the connection section, and
   the autonomous operation detector of each power supply unit is adapted to shift the frequency of the AC voltage outputted from the associated power supply unit in a positive or a negative direction and then in the negative or positive direction for a predetermined time period from the generation of the autonomous operation detection synchronizing signal, and determine that the external AC power supply is shut off when the waveform detected by the waveform detector has a frequency other than the frequency of the external AC power supply during the predetermined period.

8. A power supply system according to claim 1, wherein the inverter control unit of each of the power supply units further comprises a synchronization controller for synchronizing the phase of the AC voltage outputted from the associated inverter to the phase of the AC voltage output from the inverter of another power supply unit during an autonomous operation in which the power supply system is disconnected from the external AC power supply, or to the phase of the AC voltage of the external AC power supply.

9. A power supply system according to claim 8 further comprising synchronizing signal lines connected in common to the plurality of power supply units, wherein the synchronizing controller of each power supply unit comprises:
   a synchronizing signal generator circuit for generating a synchronizing signal having a first cycle synchronized to the AC voltage outputted from the associated inverter and outputting the synchronizing signal onto the synchronizing signal line, in which the synchronizing signal generator circuit generates the synchronizing signal having the first cycle from a reception timing of the synchronizing signal generated by itself or the synchronizing signal outputted onto the synchronizing signal line from the synchronizing signal generator circuit of another power supply unit.

10. A power supply system according to claim 8, wherein each of the power supply units further comprises a waveform detector for detecting the waveform of an AC voltage at the connection section, and an external power supply shut-off detector for detecting whether the external AC power supply is shut off, and
    the external power supply shut-off detector of each power supply unit periodically shifts the frequency of the AC voltage outputted from the associated power supply unit in a positive or a negative direction and then in the negative or positive direction for a predetermined period, and determines that the external AC power supply is shut off when the waveform detected by the waveform detector has a frequency other than the frequency of the external AC power supply during the predetermined period.

11. A power supply system for supplying electric power to a load, comprising:
    power transmission lines for supplying electric power to the load in at least one of a linkage operation with an external AC power supply and an autonomous operation in which the power supply system is disconnected from the external AC power supply;
    a plurality of power supply units, outputs of which are parallelly connected to the power transmission lines, each of the plurality of power supply units comprising:
       a generator;
       an inverter for converting a voltage generated by the generator into an AC voltage and outputting the AC voltage;
       an inverter control unit for controlling the inverter, comprising a synchronization controller for synchronizing the phase of the AC voltage outputted from the inverter to the phase of a predetermined AC voltage; and
       a connection apparatus for supplying the AC voltage outputted from the inverter to the power transmission lines; and
    a multiple power unit controller for controlling each of the power supply units to start and stop and for controlling the output of each power supply unit, wherein
    the system further comprises communication lines such as wireless communication lines, optical communication lines, and a digital bus,
    the multiple power unit controller is adapted to supply a control signal for controlling the operation of the plurality of power supply units to the plurality of power supply units through the communication lines, and
    the control signal outputted from the multiple power unit controller includes a signal for controlling each of the respective power supply units to be operated to output an AC voltage having a value different to the others.

* * * * *